US012798473B2

(12) United States Patent
Mouri et al.

(10) Patent No.: US 12,798,473 B2
(45) Date of Patent: Nov. 17, 2026

(54) ROAD SURFACE ILLUMINATING DEVICE FOR VEHICLE

(71) Applicant: TOYOTA JIDOSHA KABUSHIKI KAISHA, Aichi-ken (JP)

(72) Inventors: Fumihiko Mouri, Owariasahi (JP); Ken Watanabe, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 364 days.

(21) Appl. No.: 18/522,243

(22) Filed: Nov. 29, 2023

(65) Prior Publication Data

US 2024/0181957 A1 Jun. 6, 2024

(30) Foreign Application Priority Data

Dec. 2, 2022 (JP) ................................ 2022-193330

(51) Int. Cl.
*B60Q 1/16* (2006.01)
*G06V 20/58* (2022.01)

(52) U.S. Cl.
CPC ............... *B60Q 1/16* (2013.01); *G06V 20/58* (2022.01); *B60Q 2400/50* (2013.01)

(58) Field of Classification Search
CPC ........ B60Q 1/16; B60Q 2400/50; B60Q 1/18; B60Q 1/28; B60Q 1/52; B60Q 2300/30; G06V 20/58
See application file for complete search history.

(56) References Cited

U.S. PATENT DOCUMENTS

| | | | | |
|---|---|---|---|---|
| 2015/0224926 | A1* | 8/2015 | Mochizuki | B60Q 9/008 701/36 |
| 2017/0067609 | A1* | 3/2017 | Ichikawa | B60Q 1/0041 |
| 2020/0339031 | A1* | 10/2020 | Nakabayashi | B60Q 1/04 |
| 2021/0354644 | A1* | 11/2021 | Navarro | B60Q 1/52 |
| 2022/0340130 | A1* | 10/2022 | Motoyama | B60W 30/095 |
| 2022/0348139 | A1* | 11/2022 | Roeber | B60Q 1/535 |
| 2022/0379910 | A1* | 12/2022 | Hagaribommanahalli | B60W 40/09 |
| 2023/0356653 | A1* | 11/2023 | Nagata | B60Q 1/247 |

FOREIGN PATENT DOCUMENTS

| | | | | |
|---|---|---|---|---|
| EP | 3401161 | A2 | | 11/2018 |
| EP | 3871924 | A1 | | 9/2021 |
| JP | H03-144799 | A | | 6/1991 |
| JP | H06065089 | U | | 9/1994 |
| JP | 2015-153057 | A | | 8/2015 |
| JP | 2015-164828 | A | | 9/2015 |
| JP | 2016143399 | A | * | 8/2016 |
| JP | 2018-192836 | A | | 12/2018 |
| JP | 2019-051792 | A | | 4/2019 |

(Continued)

*Primary Examiner* — Ellis B. Ramirez
*Assistant Examiner* — John Martin O'Malley
(74) *Attorney, Agent, or Firm* — HAUPTMAN HAM, LLP

(57) ABSTRACT

A road surface illuminating device includes an illuminating unit mounted on a vehicle and illuminating a road surface with patterned light, an environmental sensor that detects an obstacle around the vehicle, and an illumination controller that controls the illuminating unit. The illumination controller allows emission of the patterned light that indicates an area where the vehicle passes without interference with the obstacle based on a detection result from the environmental sensor.

10 Claims, 11 Drawing Sheets

(56) References Cited

FOREIGN PATENT DOCUMENTS

| | | | | |
|---|---|---|---|---|
| JP | 2020-075708 | A | | 5/2020 |
| JP | 2020131897 | A | * | 8/2020 |
| WO | 2019078193 | A1 | | 4/2019 |
| WO | 2020/218498 | A1 | | 10/2020 |

* cited by examiner

ROAD SURFACE ILLUMINATING DEVICE FOR VEHICLE

CROSS REFERENCE TO RELATED APPLICATION

This application claims priority to Japanese Patent Application No. 2022-193330 filed on Dec. 2, 2022, which is incorporated herein by reference in its entirety including the specification, claims, drawings, and abstract.

TECHNICAL FIELD

The present disclosure relates to a road surface illuminating device for a vehicle.

BACKGROUND

In recent years, technologies have been proposed to transmit information to passengers or other vehicles or pedestrians in the vicinity of a vehicle by illuminating the road surface around the vehicle with patterned light. For example, JP2015-164828 A has disclosed a technology for communicating to passengers or other vehicles or pedestrians in the vicinity a distance between vehicles or whether the vehicle is changing course by illuminating a predetermined shape of patterned light in front of the vehicle. For example, JP2015-164828 A discloses a technology that determines whether a vehicle is changing lanes based on the turn signal lighting status and the steering angle, and, when the vehicle is changing lanes, illuminates patterned light in front of the vehicle that is shaped to proceed from the current travel lane to an adjacent lane after crossing the lane boundary line. According to such technology, the direction of travel of the vehicle can be communicated to the surrounding area, which effectively reduces accidents.

However, the technology described in JP2015-164828 A emits patterned light of a predetermined shape at a predetermined position with reference to the vehicle, regardless of the presence or absence of obstacles in the vicinity. Therefore, the technology described in JP2015-164828 A cannot properly emit the patterned light when there are obstacles around the vehicle. For example, in the above example, when there is an obstacle on the path of the vehicle when changing lanes, the driver naturally selects to travel along a travel path avoiding the obstacle. In JP2015-164828 A, however, the patterned light has a predetermined shape without considering such obstacles. As a result, it may happen that, depending on the presence or absence of obstacles, the actual travel path of the vehicle and the travel path indicated by the patterned light do not match, thus failing to properly communicate the travel path of the vehicle to the driver or other vehicles in the vicinity.

In view of the above, the present disclosure provides a road surface illuminating device capable of more appropriately illuminating the road surface with patterned light.

SUMMARY

A road surface illuminating device disclosed herein includes an illuminating unit mounted on a vehicle and illuminating a road surface with patterned light, an environmental sensor that detects an obstacle around the vehicle, and an illumination controller that controls the illuminating unit, in which the illumination controller allows emission of the patterned light indicating an area where the vehicle passes without interference with the obstacle according to a detection result from the environmental sensor.

Such a structure allows emission of the patterned light indicating the path that the vehicle can actually pass. This enables drivers of the vehicle and other vehicles to easily judge where they should travel in order to avoid contact with each other.

In this case, the patterned light may have a width equal to or greater than the width of the entire vehicle including side mirrors.

Such a structure allows the presence or absence of interference between the vehicle and other vehicles to be determined more clearly.

The illumination controller may also determine the direction of travel of the vehicle based on the speed and steering angle of the vehicle when there is no obstacle in front of the vehicle.

Such a structure allows emission of appropriately shaped patterned light even when there is no obstacle.

The illumination controller may also change the length of the patterned light based on the speed of the vehicle or a relative speed between the vehicle and other vehicles.

The environmental sensor may include a camera.

The vehicle may be an emergency vehicle, and the illumination controller may permit emission of the patterned light only when the vehicle makes an emergency run.

When the emergency vehicle makes an emergency run, it is necessary to inform other vehicles of the area where the emergency vehicle would pass, and ask them to retreat to positions where they do not come in contact with the emergency vehicle. By illuminating the area with patterned light during the emergency run, other vehicles can clearly determine where they should retreat to, thus effectively preventing contact between the emergency vehicle and other vehicles.

In this case, the vehicle is an emergency vehicle, and the illumination controller may allow emission of the patterned light extending in a direction parallel to the lanes while overlapping the roadway center line or lane boundary line while the vehicle makes an emergency run.

Emergency vehicles are permitted to travel while straddling two lanes. Therefore, by allowing emission of the patterned light extending in a direction parallel to the lanes while overlapping the roadway center line or lane boundary line, the patterned light suitable for emergency run can be emitted.

The vehicle may be a non-emergency vehicle, and the illumination controller may specify the shape of the patterned light so that there is no overlap between demarcation lines and the end point of the patterned light and there is no overhang of the patterned light from the demarcation lines where overhang is prohibited.

Such a structure allows emission of the patterned light suitable for non-emergency vehicles.

The illumination controller may provide the patterned light shaped to avoid interference with the obstacle. When the length of the patterned light becomes shorter than a predetermined reference pattern length as a result of avoiding the interference with the obstacle, the illumination controller may issue an alert to passengers of the vehicle.

Such a structure issues an alert when the vehicle comes into a situation where the vehicle is unable to travel properly due to a large number of obstacles. As a result, the driver of the vehicle can easily understand that driving cannot continue properly.

The technology disclosed herein can more appropriately illuminate the road surface with patterned light.

DESCRIPTION OF EMBODIMENTS

Overall Structure

Figure 1:
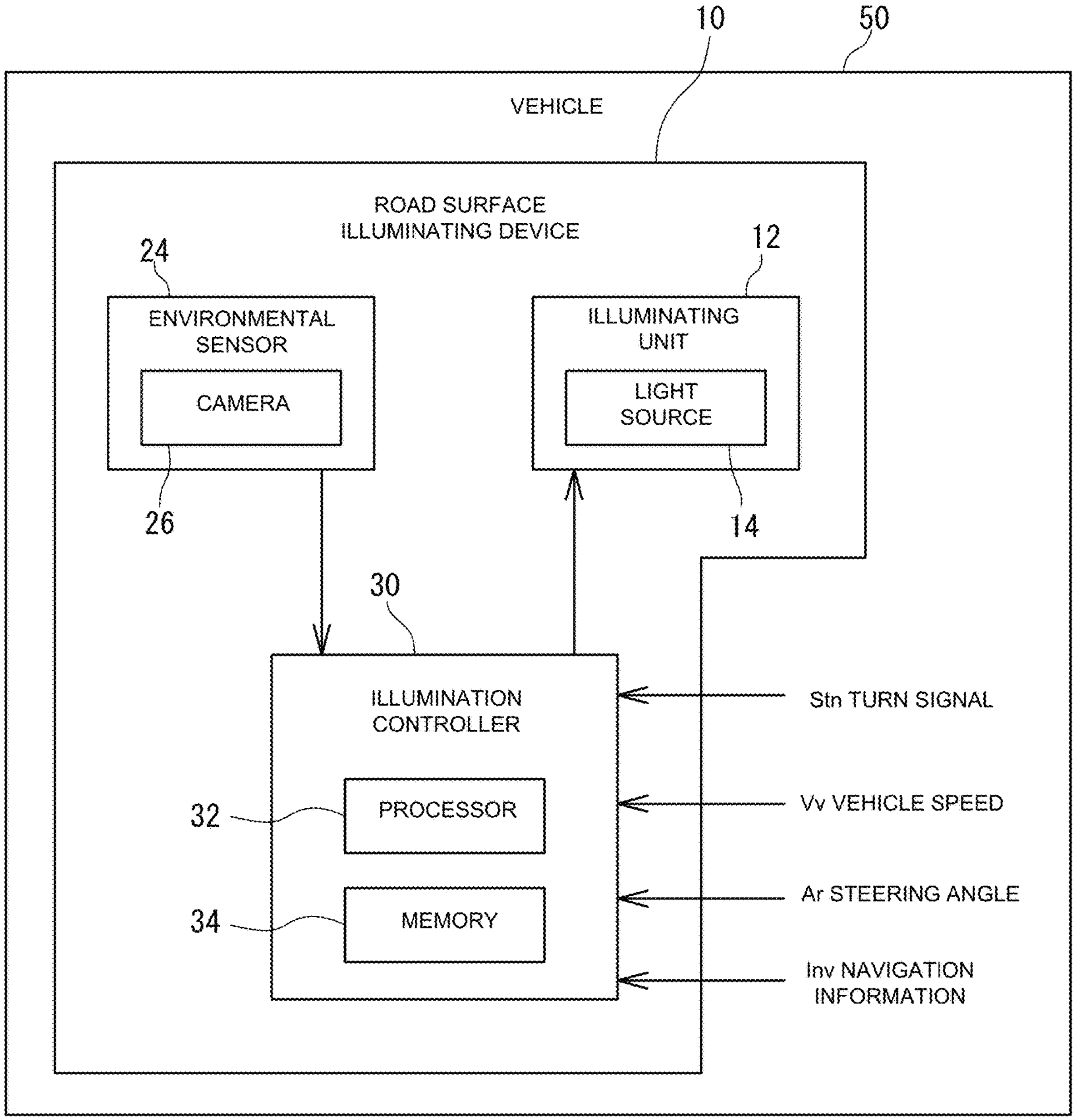
FIG. 1 is a block diagram illustrating a structure of a road surface illuminating device.
Figure 2:
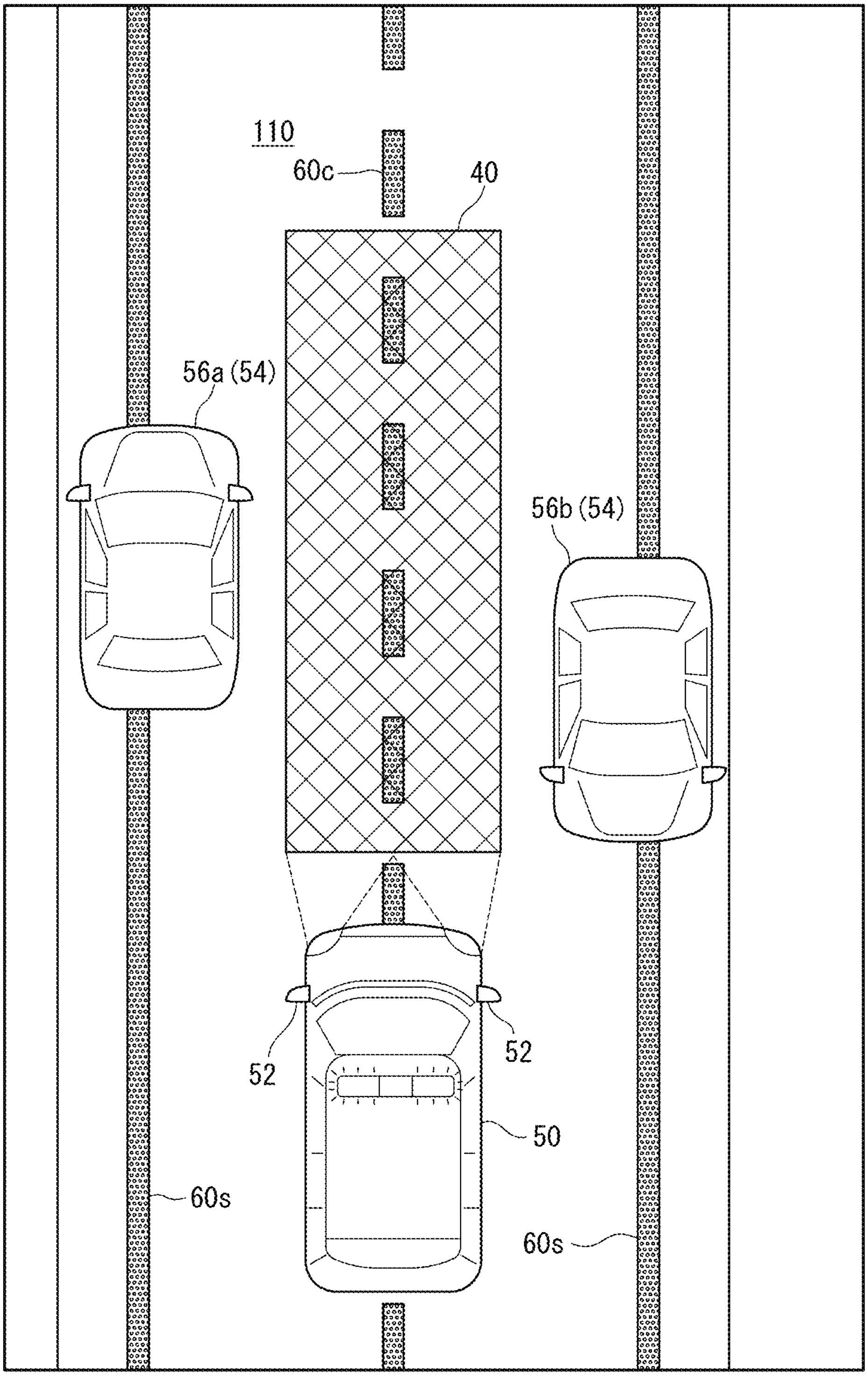
FIG. 2 is a schematic diagram illustrating how the road surface illuminating device illuminates a road surface with patterned light.

A road surface illuminating device 10 of a vehicle 50 will be described with reference to the accompanying drawings. FIG. 1 is a block diagram illustrating a structure of the road surface illuminating device 10. FIG. 2 is a schematic diagram illustrating how the road surface illuminating device 10 illuminates the road surface with patterned light 40. Note that the following description is based on the case where left-side driving is prescribed for vehicles. Therefore, vehicles travel in the left lane of the road in principle. In making a right turn, a vehicle crosses the oncoming lane. Of course, the techniques disclosed herein can also be applied to the case where right-side driving is prescribed for the vehicle 50.

The road surface illuminating device 10 is a device that illuminates the road surface in front of a vehicle 50 with the patterned light 40 indicating the passing area of the vehicle 50. In the following, the road surface illuminating device 10 mounted on an emergency vehicle is described as an example. Emergency vehicles are vehicles used for highly public and urgent operations such as lifesaving and firefighting response. For example, emergency vehicles include, for example, ambulances, fire trucks, and police vehicles. These emergency vehicles are permitted to make an emergency run under certain conditions where they have priority on the road. During the emergency run, the emergency vehicles are permitted to travel in the oncoming lane (so-called reverse driving) and are exempted from the obligation to stop at traffic signals and the like.

As illustrated in FIG. 1, the road surface illuminating device 10 includes an illuminating unit 12, an environmental sensor 24, and an illumination controller 30. The illuminating unit 12 emits the patterned light 40 onto the road surface in front of the vehicle. The illuminating unit 12 is incorporated, for example, into a headlamp unit (not illustrated) of the vehicle 50. The headlamp unit is an illuminating device installed in the vehicle to improve the visibility of the driver of the vehicle 50 and the visibility of the vehicle 50 from the outside. The headlamp unit is provided at both ends of the front side of the vehicle 50, with one at the right end and one at the left end. The illuminating unit 12 may be, for example, an adaptive high-beam system unit (hereinafter will be referred to as an "AHS") incorporated into the headlamp unit. The AHS is an illuminating unit that automatically blocks only a portion of the high-beam light flux illuminating the vehicle ahead or the oncoming vehicle.

Figure 3:
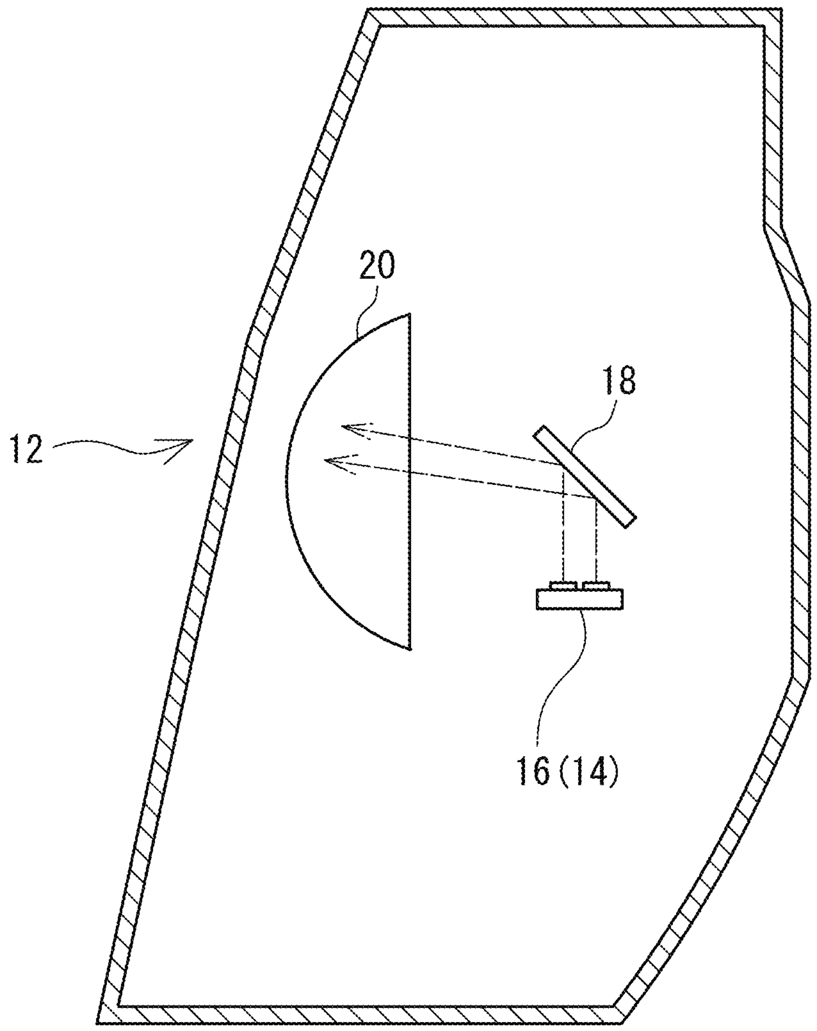
FIG. 3 is a schematic diagram illustrating a structure of an illuminating unit.

FIG. 3 is a schematic diagram of the illuminating unit 12. The illuminating unit 12 includes an LED array 16 which acts as a light source 14 of the illuminating unit 12 and includes a plurality of LEDs arranged in a matrix. The illumination controller 30, which will be described later, controls the lighting state of the plurality of LEDs independently of each other according to the presence or absence of other vehicles around the vehicle 50, the shape of the patterned light 40 to be emitted, and the like.

On the light emitting side of the LED array 16, a reflector 18 and a lens 20 are arranged in sequence. The light emitted from the LED array 16 is reflected by the reflector 18, refracted by the lens 20, and emitted in front of the vehicle. The reflector 18 can rotate. The illumination controller 30 controls the rotation of the reflector 18 according to, for example, the shape of the patterned light 40 to be emitted. The structure of the illuminating unit 12 described here is an example and may be modified as necessary. For example, the illuminating unit 12 may be a projector provided independently of the headlamp unit.

The environmental sensor 24 is a sensor that detects an obstacle 54 in front of the vehicle 50. The environmental sensor 24 has, for example, a camera 26 that captures images of the front of the vehicle. The camera needs to image the front of the vehicle 50, and the number and position of the cameras 26 are not limited. Thus, a total of two cameras 26 may be mounted, one for each of side mirrors 52 on the left and right sides of the vehicle 50. Alternatively, the camera 26 may be placed on the front bumper or roof of the vehicle 50, and the number of cameras 26 may not be limited to two and may be changed.

The environmental sensor 24 may include other sensors in addition to or instead of the camera 26. For example, the environmental sensor 24 may include at least one of an ultrasonic sonar, an infrared sensor, a millimeter wave radar, and a LIDAR. The results of the detection by the environmental sensor 24 are transmitted to the illumination controller 30 from time to time.

The illumination controller 30 is physically a computer with a processor 32 and a memory 34. The "computer" also includes a microcontroller that incorporates the computer system into a single integrated circuit. Although a single processor 32 and a single memory 34 are illustrated in FIG. 1, the illumination controller 30 may include two or more processors 32 and two or more memories 34. The illumination controller 30 may also be composed of a combination of multiple computers physically separated from each other.

The illumination controller 30 controls the driving of the illuminating unit 12 to emit the patterned light 40 onto the road surface. The illumination controller 30 determines the shape and illuminating position of the patterned light 40 based on the detection results from the various sensors and the control information of the vehicle 50. The illumination controller 30 receives the detection results from the environmental sensor 24. The illumination controller 30 determines a movable area Amv of the vehicle 50 based on the detection results from the environmental sensor 24. More specifically, the illumination controller 30 determines the position, shape, and type of the obstacle 54 around the vehicle by analyzing an image captured by the camera 26 (hereinafter referred to as a "target image"). Based on the results of this determination, the movable area Amv where the vehicle 50 can move is determined. The illumination controller 30 also identifies demarcation lines drawn on the road surface based on the target image. The demarcation lines are lines that represent the boundaries of the lanes and include a roadway center line 60*c* (see FIG. 2) that indicates the boundary between the traveling lane and the oncoming lane, a lane boundary line 60*b* (see FIG. 5) that indicates the boundary between two lanes proceeding in the same direction, and roadway outer lines 60*s* (see FIGS. 2 and 5) that indicate the edges of the roadway in a width direction. Hereafter, these lines will simply be referred to as "demarcation lines 60" when they are not distinguished.

The illumination controller 30 further receives a turn signal Stn, a vehicle speed Vv, a steering angle Ar, and navigation information Inv. The turn signal Stn is a control signal that is generated in conjunction with lighting of the turn signal lamps (not illustrated). Since turn signal lamps are installed on right and left sides of the vehicle 50, there are two types of turn signals Stn, one corresponding to the right side and the other corresponding to the left side. The navigation information Inv is information transmitted from a navigation device (not illustrated) installed in the vehicle 50. The navigation information Inv includes, for example, the travel path of the vehicle 50 that has been set by the passengers.

Next, the emission of the patterned light 40 by the road surface illuminating device 10 is described. As mentioned above, the vehicle 50 in this example is an emergency vehicle. As illustrated in FIG. 2, the road surface illuminating device 10 illuminates the road surface with the patterned light 40 indicating the passing area of the vehicle 50 when the vehicle 50 makes an emergency run. The passing area is the area that the vehicle 50 is expected to pass through, and has the same width as, or is slightly larger than, the width of the vehicle 50. When there is no obstacle 54 in the passing area, it is considered that the vehicle 50 can travel smoothly in the passing area. By illuminating the road surface with the patterned light 40 indicating such a passing area, the driver of the vehicle 50 can easily judge whether the vehicle 50 is going to come in contact with the obstacle 54. Also, by the emission of the patterned light 40, the drivers of other vehicles 56*a*, 56*b* can easily judge where they should retreat to avoid contact with the vehicle 50.

Figure 4:
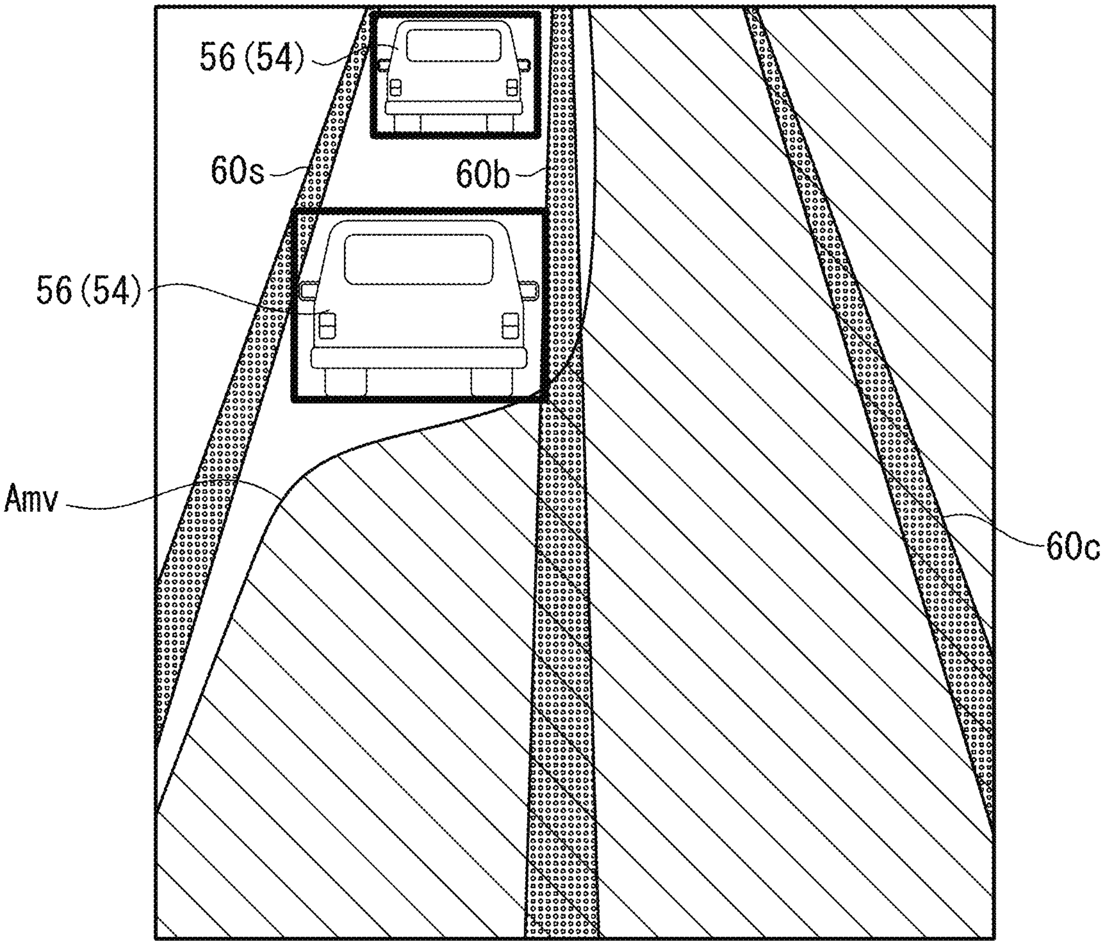
FIG. 4 is a schematic diagram of an image captured by a camera.
Figure 5:
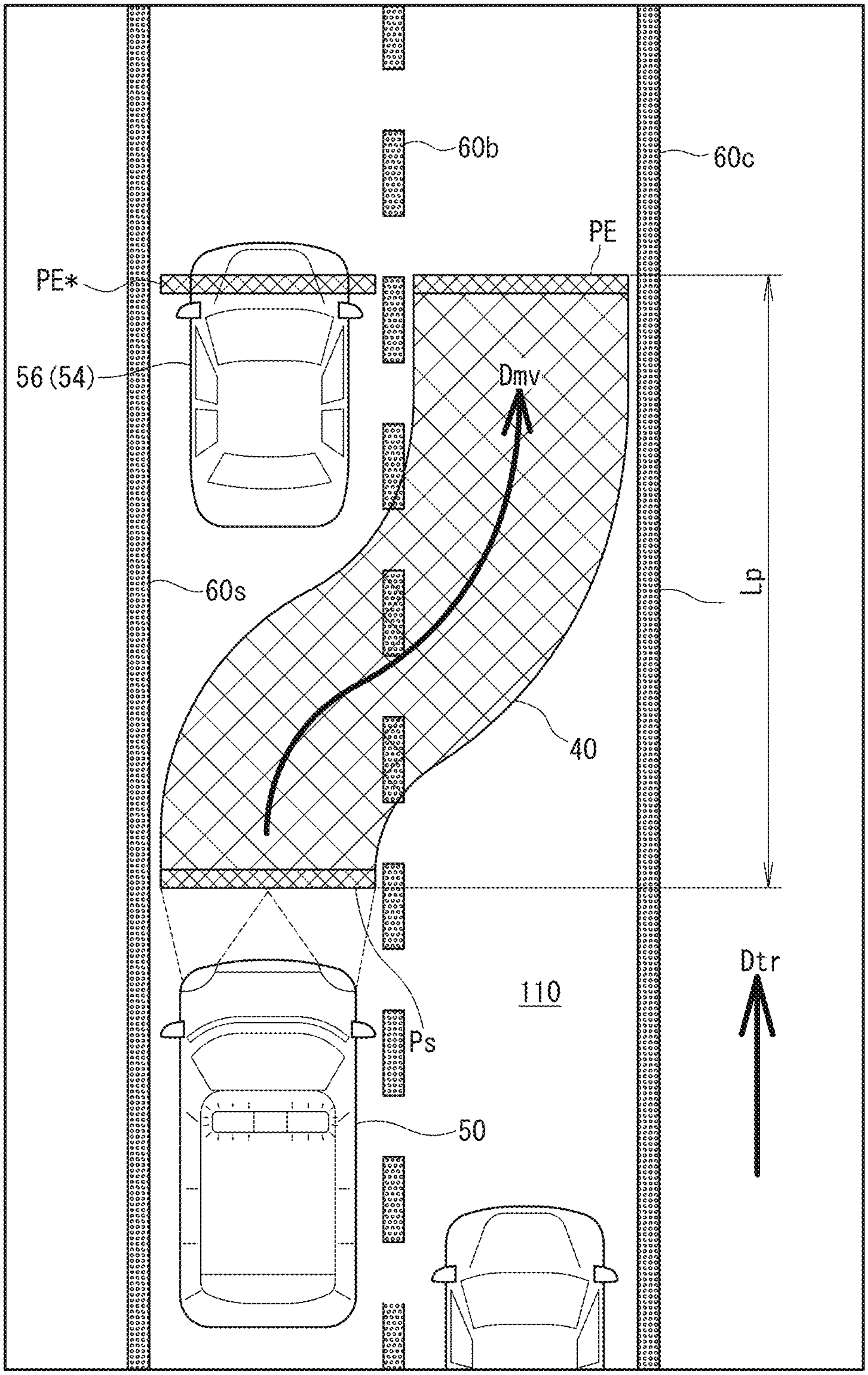
FIG. 5 is a plan view illustrating emission of patterned light.

In this example, the illumination controller 30 determines the movable area Amv where the vehicle 50 can move based on the detection result from the environmental sensor 24, and emits the patterned light 40 to this movable area Amv, which is explained with reference to FIGS. 4 and 5. FIG. 4 is a schematic diagram of the image captured by the camera 26. FIG. 5 is a plan view illustrating the emission of the patterned light 40. In the following description, the direction in which the vehicle 50 moves is referred to as a "direction of movement Dmv." The direction parallel to the lane and downstream of the direction of movement Dmv of the vehicle 50 is referred to as a "direction of travel Dtr" which is distinguished from the direction of movement Dmv. In the example of FIG. 5, the direction of travel Dtr is from the bottom and straight upward to the upper side of the drawing. On the other hand, in the example of FIG. 5, the vehicle 50 moves in the upper right direction of the drawing to overtake another vehicle 56 ahead of it, so this upper right direction of the drawing is the direction of movement Dmv.

When emitting the patterned light 40, the illumination controller 30 determines the movable area Amv based on the detection result from the environmental sensor 24. For example, consider the case where the target image illustrated in FIG. 4 is obtained by the camera 26. In this case, the illumination controller 30 performs various image recognition processing on the target image to extract the obstacles 54 (which are represented by other vehicles 56 in the example of FIG. 4) and the demarcation lines 60. The obstacles 54 are intended to include other vehicles 56, pedestrians, and structures such as guardrails. The illumination controller 30 also identifies the location and type of each of the extracted obstacles 54 and the demarcation lines 60. The locations of the obstacles 54 and the demarcation lines 60 are identified, for example, by triangulation. The types of obstacles 54 and demarcation lines 60 are identified using techniques such as template matching. The illumination controller 30 identifies the width of a road 110, the lane conditions, and the longitudinal direction of the road 110 (and thus the direction of travel Dtr of the vehicle 50) based on the locations and types of the identified demarcation lines 60. In addition, the illumination controller 30 identifies the movable area Amv of the vehicle 50 based on the locations and types of the identified obstacles 54. Specifically, the illumination controller 30 identifies the area in a space in front of the vehicle 50 avoiding the obstacles 54 as the movable area Amv. In the example of FIG. 4, the area shaded by hatched lines is the movable area Amv.

Once the movable area Amv is identified, the illumination controller 30 identifies the passing area, and thus the shape of the patterned light 40, within this movable area Amv. No particular limitation is imposed on this procedure for identifying the shape of the patterned light 40. For example, the shape of the patterned light 40 is identified by the following procedure. The illumination controller 30 sets a pattern starting point PS having the same width as the patterned light 40 at a position just in front of the vehicle 50, while setting a temporary pattern end point PE* having the same width as the patterned light 40 at a position distant from the pattern starting point PS by a specified reference pattern length Lp in the downstream direction of the direction of travel Dtr. When all or part of the temporary pattern end point PE* is outside the movable area Amv (not illustrated in FIG. 5), the illumination controller 30 can move the temporary pattern end point PE* in the vehicle width direction so that all of the temporary pattern end point PE* is located within the movable area Amv. When the entire temporary pattern end point PE* is located within the movable area Amv, the obtained temporary pattern end point PE* is set as the final pattern end point PE. Accordingly, a band shape for smoothly connecting the obtained pattern end point PE and the pattern starting point PS is calculated, and the obtained band shape is identified as the shape of the patterned light 40.

In a case in which the temporary pattern end point PE* does not fit into the movable area Amv even after moving the temporary pattern end point PE* to the edge of the road 110, the illumination controller 30 repeats the same process by gradually moving the temporary pattern end point PE* closer to the vehicle 50 until the entire temporary pattern end point PE* is located within the movable area. In this case, naturally, the length of the final patterned light 40 is shorter than the reference pattern length Lp. Also, it is regarded in this case that the area necessary for the passage of the vehicle 50 is insufficient. Therefore, when the length of the patterned light 40 is shorter than the reference pattern length Lp, the illumination controller 30 may alert the passengers of the vehicle 50 of this in some manner. For example, the illumination controller 30 may issue an alert by emitting the patterned light 40 in a manner different from the usual, for example, in a different color or by blinking, when the length of the patterned light 40 is short. Alternatively, the illumination controller 30 may display an alert message on an in-vehicle display when the length of the patterned light 40 is short.

The illumination controller 30 emits the patterned light 40 of the identified shape onto the road surface. This allows the driver of vehicle 50 to easily recognize a pathway that can be traveled without coming into contact with the obstacle 54. On the other hand, the drivers of other vehicles 56 can clearly know where they should retreat to avoid contact with the vehicle 50.

In this example, the vehicle 50 is the emergency vehicle, and the patterned light 40 is emitted while the vehicle 50 is making an emergency run. During the emergency run, the vehicle 50 is permitted to enter the oncoming lane or to straddle two lanes. In other words, during the emergency run, the vehicle 50 does not need to comply with the restrictions defined by the roadway center line 60*c* or the lane boundary line 60*b*. Therefore, this example allows emission of the patterned light 40 extending in a direction parallel to the road 110 while straddling the roadway center line 60*c* or the lane boundary line 60*b*.

Figure 6:
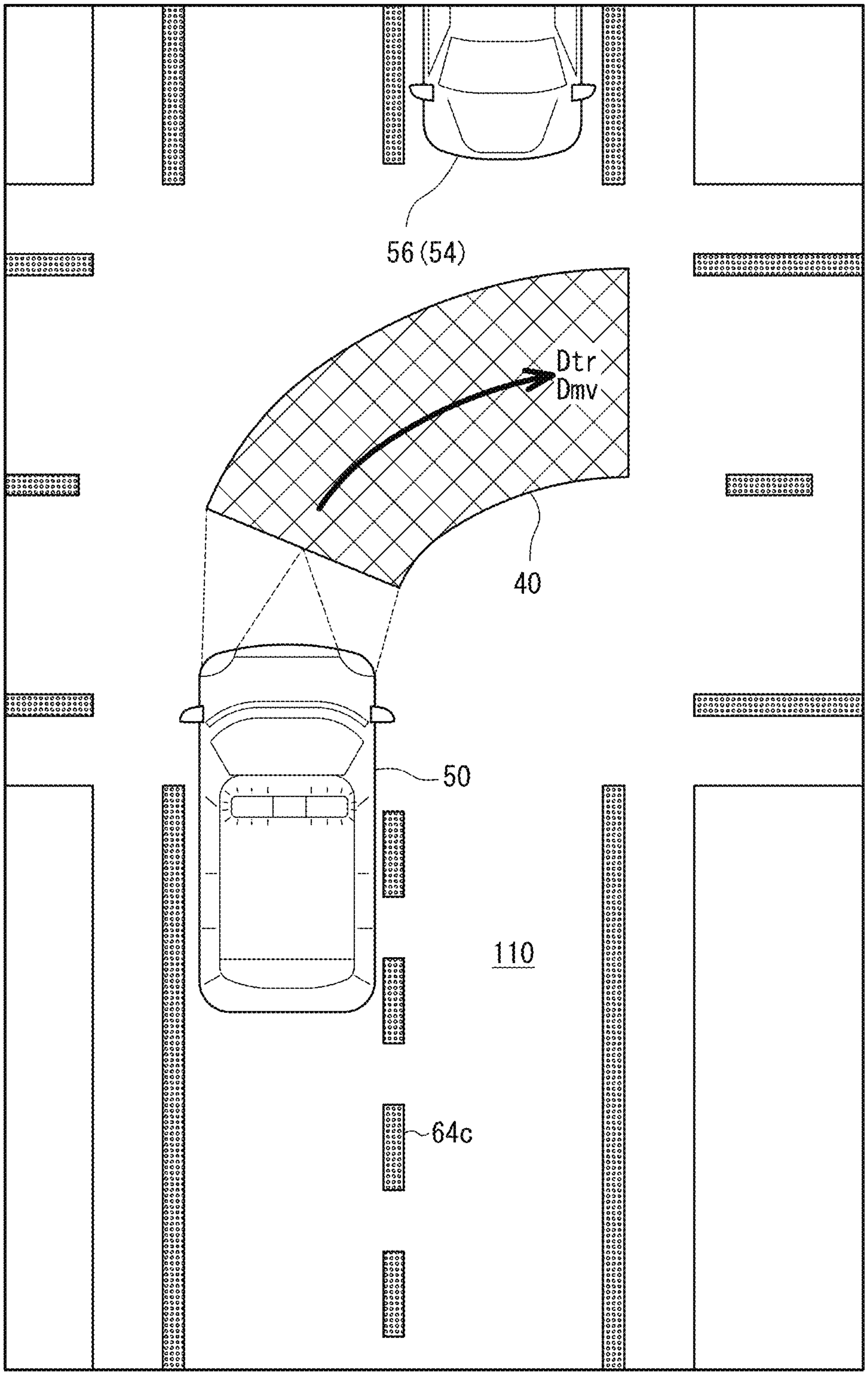
FIG. 6 is a schematic diagram illustrating a vehicle making a right turn at an intersection.

Next, the case in which the vehicle 50 turns right or left is described. FIG. 6 is a schematic diagram of the vehicle 50 making a right turn; that is, turning across an oncoming lane 64*b*, at an intersection. In the case of the right or left turn, the direction of travel Dtr is the direction of the line smoothly connecting the lane in which the vehicle is traveling before making the right or left turn with the lane in which the vehicle enters after making the right or left turn.

In the case of turning right or left, the illumination controller 30 also identifies the movable area Amv based on the detection result from the environmental sensor 24, and emits the patterned light 40 indicating the passing area of the vehicle 50 onto the area within this movable area Amv. In the case of the right turn, the patterned light 40 is curved toward the front of the vehicle 50 diagonally to the right, as illustrated in FIG. 6.

In order to properly emit the patterned light 40 during the right or left turn, the illumination controller 30 determines whether the right or left turn is going to be made. For example, the illumination controller 30 determines whether the right or left turn is going to be made based on the turn signal Stn, the vehicle speed Vv, and the steering angle Ar. Specifically, when either the right or left turn signal Stn is output, the vehicle speed Vv is equal to or less than a predetermined first reference value, and the steering angle Ar is inclined in the same direction as the direction indicated by the turn signal Stn, the illumination controller 30 determines that the vehicle 50 is going to turn in the same direction as the direction indicated by the turn signal Stn. The first reference value is the speed at which the vehicle can be considered to be traveling slowly. Alternatively, the illumination controller 30 may determine whether the right or left turn is going to be made based on the navigation information Inv.

Figure 7:
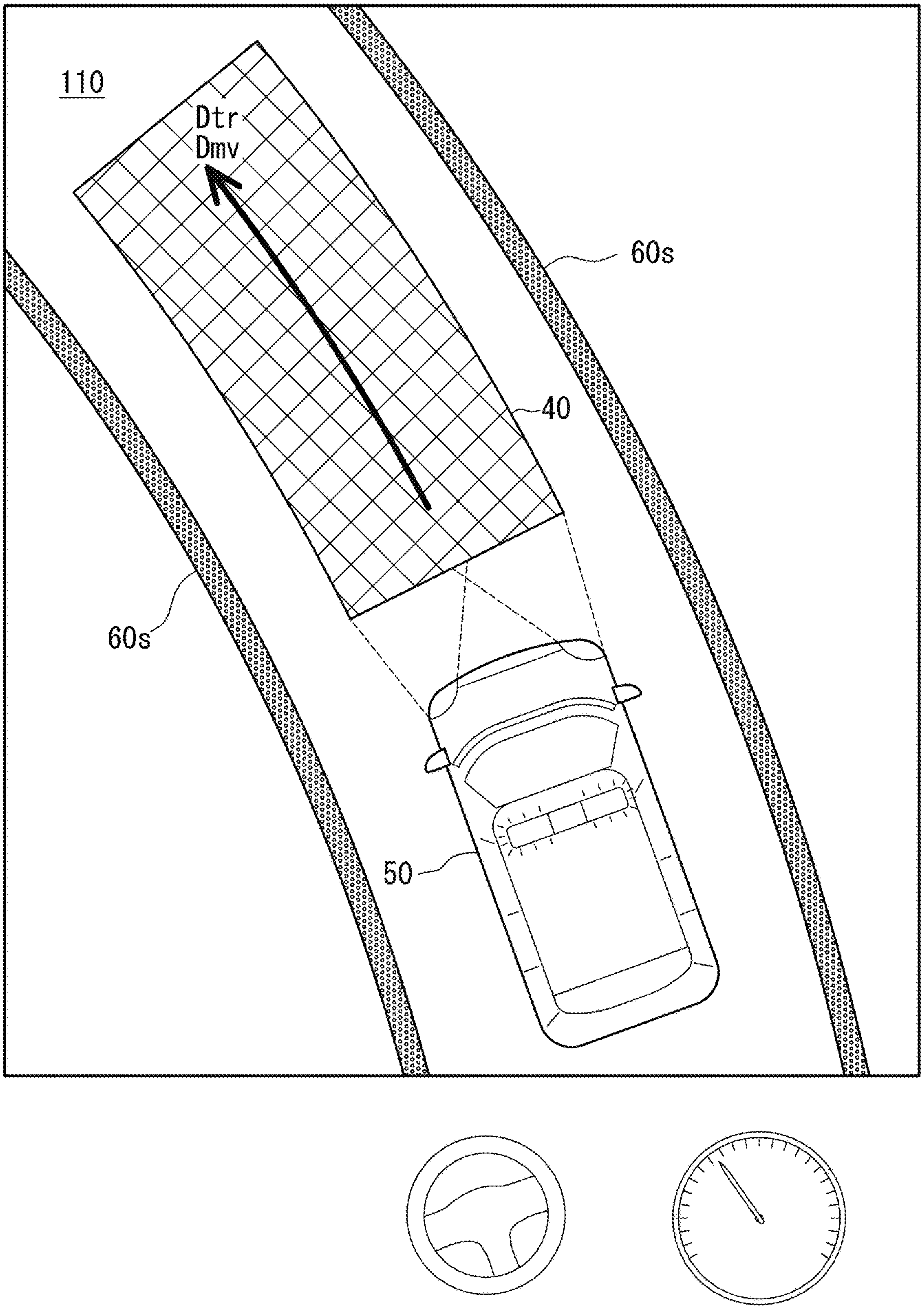
FIG. 7 is a schematic diagram illustrating a vehicle traveling on a curved road.

Heretofore, the direction of travel Dtr of the vehicle 50 has been identified based on the demarcation lines 60. However, when no obstacle 54 is present in front of the vehicle, the illumination controller 30 may identify the direction of travel Dtr of the vehicle 50 based on the vehicle speed Vv and the steering angle Ar of the vehicle 50, which is explained with reference to FIG. 7. FIG. 7 illustrates a schematic diagram of the vehicle 50 traveling on a curved road.

In FIG. 7, the driver of the vehicle 50 has turned the steering wheel to the left to drive on a curved road. Naturally, the turn signal Stn is not output at this time. As illustrated in FIG. 7, the illumination controller 30 determines that the vehicle 50 is traveling on a curved road when the steering angle Ar is tilted while no obstacle 54 is present in front of the vehicle and the turn signal Stn is not output. In this case, the illumination controller 30 estimates the direction of travel Dtr of the vehicle 50 based on the steering angle Ar and the vehicle speed Vv, and determines the passing area, and thus the shape of the patterned light 40, based on the estimated direction of travel Dtr.

In the above description, the patterned light 40 has been emitted during the emergency run of the vehicle 50. However, the patterned light 40 may also be emitted when the vehicle 50 travels normally. For example, consider the case where the vehicle 50 is a non-emergency vehicle which does not make an emergency run. Even in such a case, the vehicle 50 may emit the patterned light 40 when it overtakes a preceding vehicle or passes through a narrow lane. Such emission of the patterned light 40 may be performed in response to an instruction from the passenger of the vehicle 50. For example, the illumination controller 30 may emit the patterned light 40 when the passenger presses a predetermined switch.

Even when the vehicle 50 is a non-emergency vehicle, the illumination controller 30 identifies the movable area Amv based on the detection result from the environmental sensor 24, and the passing area of the vehicle 50 and then the shape of the patterned light 40 is identified within the movable area Amv. However, in the case of non-emergency vehicles, the reverse driving is not permitted, nor is straddling the lane boundary line 60*b*. Furthermore, depending on the color and shape of the roadway center line 60*c*, temporarily straddling the roadway center line 60*c* for the purpose of overtaking is also prohibited. Therefore, when the vehicle 50 is the non-emergency vehicle, the illumination controller 30 identifies the passing area by considering the lane boundary line 60*b* and the roadway center line 60*c*.

Specifically, the illumination controller 30 interprets the regulations meant by the respective lines based on the color and shape of the lane boundary line 60*b* and the roadway center line 60*c* captured in the image. For example, in Japan, when the demarcation lines 60 are white, the vehicle 50 is permitted to overstep the demarcation lines 60 for overtaking or changing lanes, and when the demarcation lines 60 are yellow, the vehicle 50 is prohibited from overstepping the demarcation lines 60. In the U.S. and China, when the demarcation lines 60 are dashed lines, the vehicle 50 is allowed to overstep the demarcation lines 60 for overtaking or changing lanes, and when the demarcation lines 60 are solid lines, the vehicle 50 is prohibited from overstepping the demarcation lines 60. That is, the yellow demarcation lines 60 indicate no-overstep lines in Japan, while in the U.S. and China, the solid demarcation lines 60 indicate no-overstep lines. Furthermore, non-emergency vehicles are prohibited from running while straddling two lanes. Therefore, when the vehicle 50 is a non-emergency vehicle, the illumination controller 30 specifies the shape of the patterned light 40 so that there is no overlap between the demarcation lines 60 and the pattern end point PE and no overhang of the patterned light 40 from the demarcation lines 60 where overstepping is prohibited.

Figure 8:
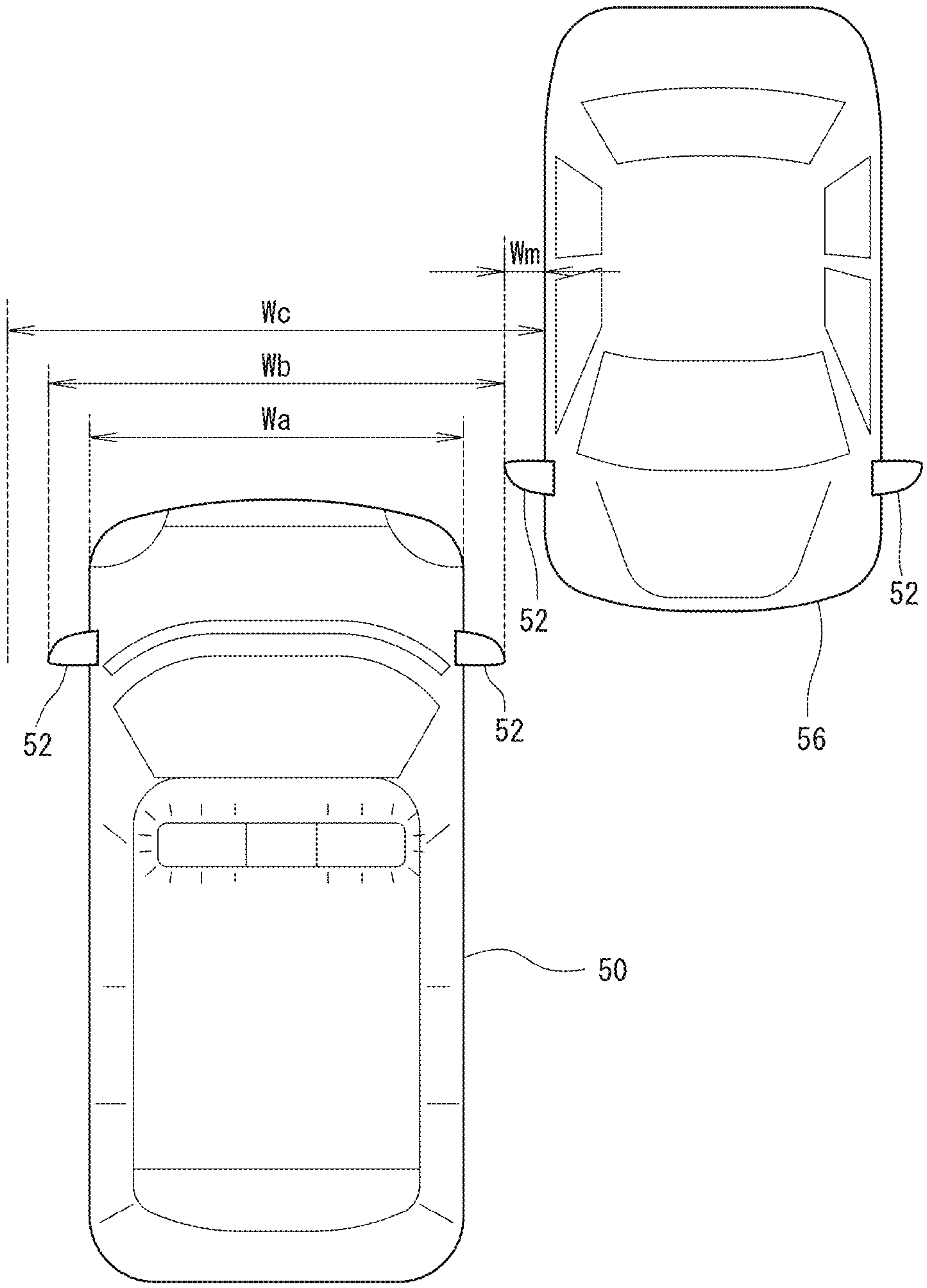
FIG. 8 illustrates the width of the patterned light.
Figure 9:
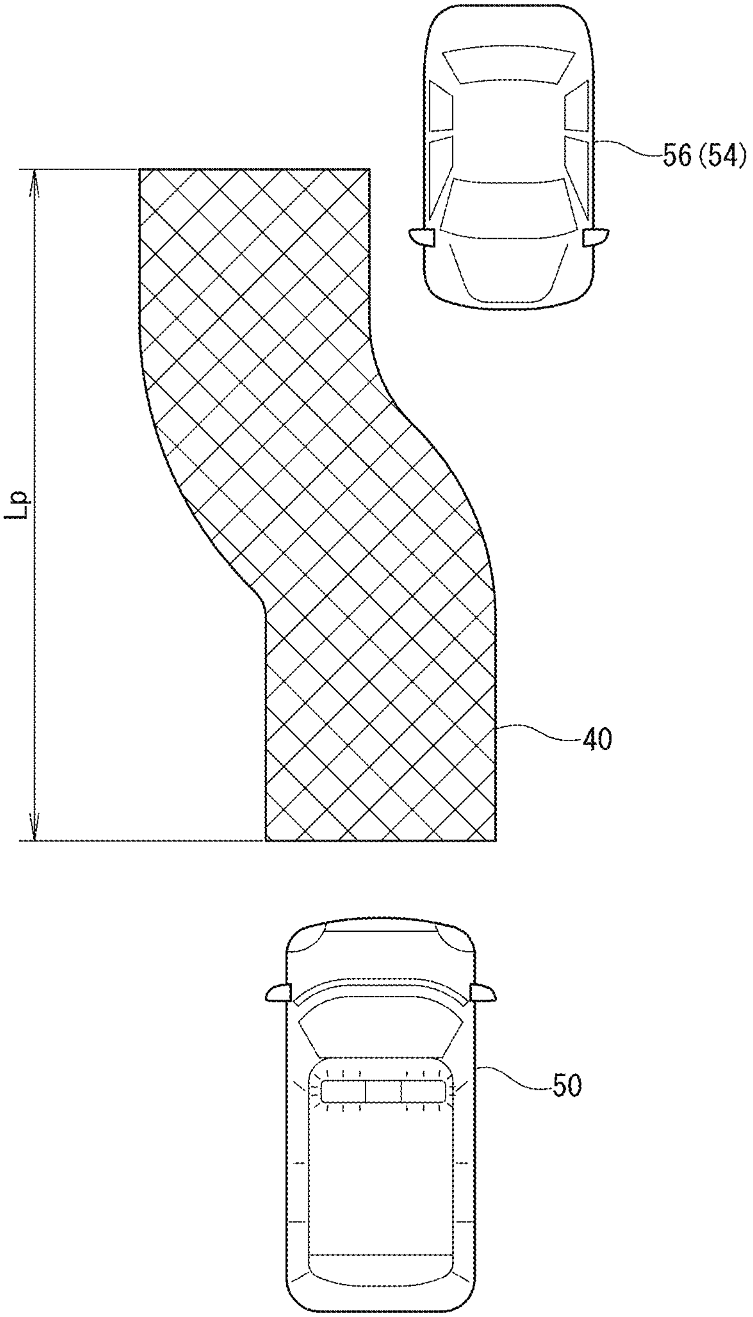
FIG. 9 illustrates the length of the patterned light.

The shape of the patterned light 40 is explained with reference to FIGS. 8 and 9. The driver of the vehicle 50 judges whether the vehicle 50 can pass or not based on the relative positional relationship between the patterned light 40 and the obstacles 54. Therefore, the patterned light 40 is required to have a width close to a vehicle width Wa (see FIG. 8) of the vehicle 50. For example, the width of the patterned light 40 is equal to or greater than a vehicle width Wa of the vehicle 50. Side mirrors 52 of the vehicle 50 usually protrude outward beyond the vehicle width Wa. To facilitate determination of the risk of contact between such side mirrors 52 and the obstacles 54, it may be possible to set the width of patterned light 40 to be equal to or greater than the width Wb of the entire vehicle including the side mirrors 52.

The patterned light 40 is emitted onto the road surface, while the side mirrors 52 of another vehicle 56 are located in the air. When the width of the patterned light 40 is set to be equal to or less than the width Wb of the entire vehicle 50, it is difficult for the driver of the vehicle 50 to determine whether the side mirrors 52 of the other vehicle 56 are located inside the patterned light 40. Therefore, the width of the patterned light 40 may be set to a width $Wc=Wb+2\times Wm$, where the width of the entire vehicle 50, Wb, is added to the maximum protrusion of the side mirrors 52, Wm, on both left and right sides. The maximum protrusion Wm of the side mirrors 52 is prescribed by law. In Japan, the maximum protrusion Wm of each side mirror 52 is 250 mm. Therefore, the width of the patterned light 40 may be Wc, where 500 mm is added to the width Wb of the entire vehicle 50. With this structure, the driver of the vehicle can more easily determine the risk of the vehicle 50 contacting the side mirror 52 of the other vehicle 56.

When the width of the patterned light 40 is excessively large, the patterned light 40 comes to interfere with the obstacle 54 more than necessary. In this case, the driver of the vehicle is likely to misjudge the vehicle 50 as impassable even when the vehicle 50 can pass smoothly. Therefore, the width of the patterned light 40 may be equal to or less than 1.4 times or 1.2 times the width Wb of the entire vehicle 50.

The reference length Lp of the patterned light 40 in the direction of travel Dtr is, for example, sufficiently long to avoid the obstacle 54. Avoiding the obstacle 54 means that the vehicle 50 stops before contacting the obstacle 54, or that the other vehicle 56, which is the obstacle 54, moves to a position where it stops or does not contact the vehicle 50.

The reference pattern length Lp may be a predetermined fixed value or a variable value that varies depending on the situation. For example, the reference pattern length Lp may vary according to the vehicle speed Vv of the vehicle 50. That is, the higher the vehicle speed Vv, the longer it takes for the vehicle 50 to come to a stop. Therefore, the higher the vehicle speed Vv, the longer the reference pattern length Lp may be. For example, the reference pattern length Lp may be a value obtained by multiplying the vehicle speed Vv by the time required for the vehicle 50 to stop.

The reference pattern length Lp may vary depending on the relative speed between the vehicle 50 and the obstacle 54. For example, when there is another vehicle 56 oncoming as the obstacle 54, the greater the relative speed between the vehicle 50 and the other vehicle 56, the longer the reference pattern length Lp may be. The relative speed can be estimated, for example, from the change over time of the size of the other vehicle 56 captured in the target image.

Thus, by changing the reference pattern length Lp according to the vehicle speed Vv of the vehicle 50 or the relative speed thereof, the risk of contact between the vehicle 50 and the obstacle 54 can be more accurately determined.

Figure 10A:
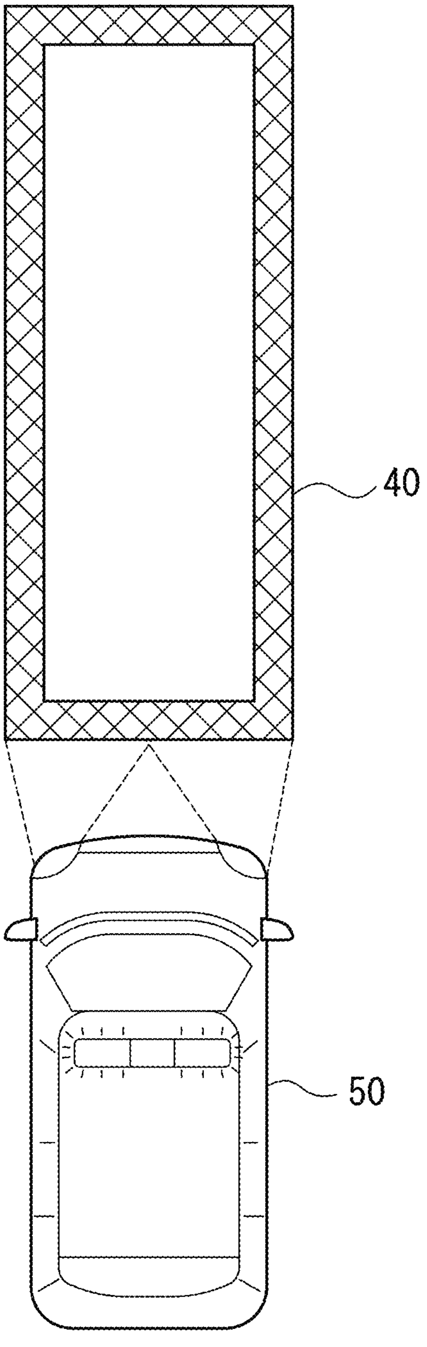
FIG. 10A illustrates another example of patterned light.
Figure 10B:
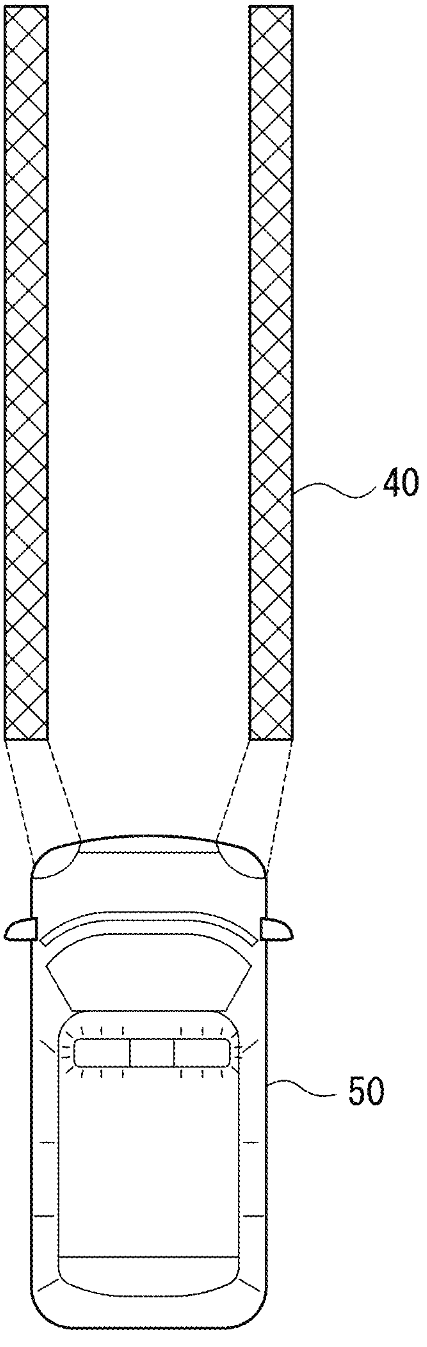
FIG. 10B illustrates another example of patterned light.
Figure 11:
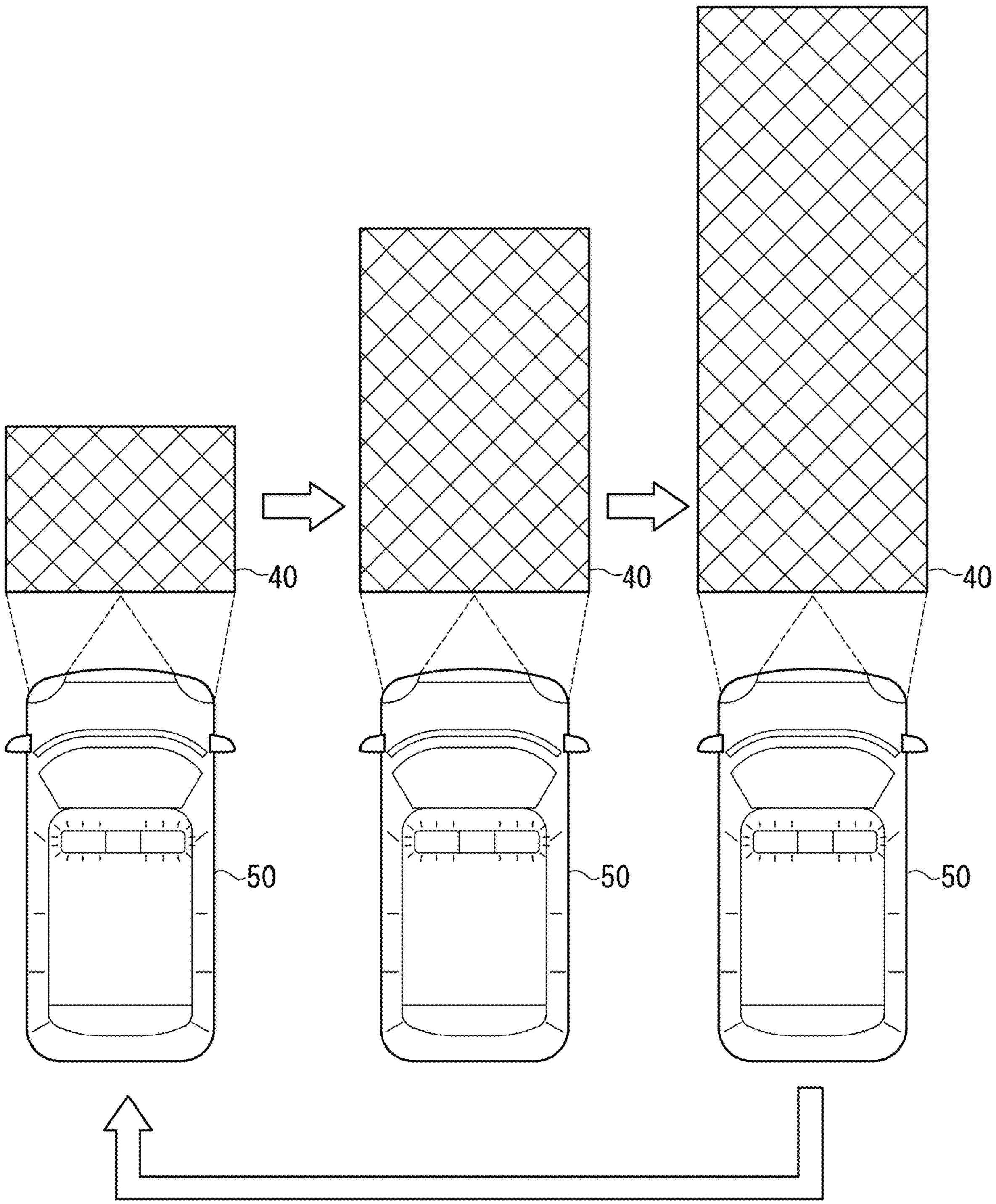
FIG. 11 illustrates other examples of patterned light.

In the description above, the patterned light 40 having a band shape has been described. However, the shape of the patterned light 40 may be changed when it represents the passing area of the vehicle 50. For example, the patterned light 40 may be a frame shape indicating the perimeter of the passing area, as illustrated in FIG. 10A. The patterned light 40 may also be line-shaped, as illustrated in FIG. 10B, indicating both end points of the passing area in the width direction. The patterned light 40 may be emitted in a form that calls the attention of drivers and others. For example, the patterned light 40 may be in a color not used in common headlights, such as red, brown, or blue. In the case of emergency vehicles, the warning light is mounted on the roof, and the patterned light 40 may be of the same color as this warning light. The patterned light 40 may be emitted in a blinking pattern rather than continuously. Furthermore, the patterned light 40 may be emitted in an animated manner by continuously switching the range of illumination. For example, as illustrated in FIG. 11, the shape of the patterned light 40 may be changed so that the length of the patterned light 40 changes over time.

Next, a reference example is briefly described. In the description above, the illumination controller 30 identifies the movable area Amv based on the detection result from the environmental sensor 24, and emits the patterned light 40 within the movable area Amv. However, in the reference example, the illumination controller 30 emits the patterned light 40 haphazardly without specifying the movable area Amv. In this case, the length of the patterned light 40 is varied according to the vehicle speed Vv of the vehicle 50 or the relative speed between the vehicle 50 and the obstacle 54.

The illumination controller 30 may emit the patterned light 40 in front of the vehicle 50 without determining the direction of movement Dmv of the vehicle 50. In other words, the longitudinal direction of the patterned light 40 may always be parallel to the front-rear axis of the vehicle 50.

Alternatively, the illumination controller 30 may identify the direction of movement Dmv of the vehicle 50 based on at least one of the steering angle Ar, the vehicle speed Vv, the turn signal Stn, and the navigation information Inv, and identify the patterned light 40 along the direction of movement Dmv. For example, when the turn signal Stn is not generated and the steering angle Ar is almost zero, the illumination controller 30 determines the front of the vehicle 50 as the direction of movement Dmv. When the turn signal Stn is not generated and the steering angle Ar is equal to or greater than a certain value, the illumination controller 30 determines that the vehicle 50 is traveling on a curved road, and calculates the direction of movement Dmv based on the steering angle Ar and the vehicle speed Vv. Furthermore, when the turn signal Stn is generated, the steering angle Ar is inclined at or above a certain level, and the vehicle speed Vv is equal to or less than the first reference value, the illumination controller 30 may also determine that the vehicle 50 is going to turn in the direction indicated by the turn signal Stn. Alternatively, the illumination controller 30 may identify the direction of movement Dmv of the vehicle 50 based on the travel route included in the navigation information Inv, and may emit the patterned light 40 along the direction of movement Dmv.

In any case, in the reference example, the presence or absence of obstacles 54 is not detected, and the patterned light 40 is emitted haphazardly. Therefore, in the reference example, the patterned light 40 may interfere with the obstacle 54. By observing the interference between the patterned light 40 and the obstacle 54, the driver can easily judge whether smooth driving is possible. When the patterned light 40 interferes with the obstacle 54, the driver can prevent contact with the obstacle 54 by stopping or changing the direction of the vehicle 50.

REFERENCE SIGNS LIST

10 Road surface illuminating device
12 Illuminating unit
14 Light source
16 LED array
18 Reflector
20 Lens
24 Environmental sensor
26 Camera
30 Illumination controller
32 Processor
34 Memory
40 Patterned light
50 Vehicle
52 Side mirror
54 Obstacle
56 Another vehicle
60 Demarcation line
60*b* Lane boundary line
60*c* Roadway center line
60*s* Roadway outside line
64*b* Oncoming lane
110 Road
Amv Movable area
Dmv Direction of movement
Dtr Direction of travel
Lp Reference pattern length
PE Pattern end point
PE* Temporary pattern end point
Pattern starting point

The invention claimed is:

1. A road surface illuminating device, comprising:
an illuminating unit mounted on a vehicle and configured to illuminate a road surface with patterned light;
an environmental sensor configured to detect an obstacle around the vehicle; and
an illumination controller configured to control the illuminating unit, wherein
the illumination controller is configured to:
calculate a movable area, which is an area avoiding the obstacle, based on a detection result of the environmental sensor, and
cause the illuminating unit to emit the movable area with the patterned light indicating an area where the vehicle passes without interference with the obstacle, and
the illumination controller is further configured to:
shape the patterned light to avoid interference with the obstacle, and
issue an alert to a passenger of the vehicle when a length of the patterned light becomes shorter than a predetermined reference pattern length as a result of avoiding the interference with the obstacle.

2. The road surface illuminating device according to claim 1, wherein
the patterned light has a width greater than or equal to a width of an entirety of the vehicle including side mirrors.

3. The road surface illuminating device according to claim 1, wherein
the illumination controller is further configured to determine a moving direction of the vehicle based on a speed and a steering angle of the vehicle when there is no obstacle in front of the vehicle.

4. The road surface illuminating device according to claim 1, wherein
the illumination controller is further configured to change the length of the patterned light based on a speed of the vehicle or a relative speed between the vehicle and another vehicle.

5. The road surface illuminating device according to claim 1, wherein
the environmental sensor includes a camera.

6. The road surface illuminating device according to claim 1, wherein
the vehicle is an emergency vehicle, and
the illumination controller is further configured to allow the illuminating unit to emit the patterned light only when the vehicle makes an emergency run.

7. The road surface illuminating device according to claim 1, wherein
the vehicle is an emergency vehicle, and
the illumination controller is further configured to allow the illuminating unit to emit the patterned light that extends in a direction parallel to a lane while overlapping a roadway center line or a lane boundary line when the vehicle makes an emergency run.

8. The road surface illuminating device according to claim 1, wherein
the vehicle is a non-emergency vehicle, and
the illumination controller is further configured to specify a shape of the patterned light that there is no overlap between a demarcation line and an end point of the patterned light, and that there is no overhang of the patterned light from the demarcation line where the overhang is prohibited.

9. The road surface illuminating device according to claim 1, wherein
the illumination controller is further configured to:
in response to an end point of the patterned light being outside the movable area, move the end point of the patterned light in a vehicle width direction to locate the end point of the patterned light within the movable area; and
in response to the patterned light not within the movable area after the end point of the patterned light is moved to an edge of a road, move the end point of the patterned light closer to the vehicle.

10. The road surface illuminating device according to claim 1, wherein
the illumination controller is further configured to
in response to the patterned light having an interfering portion interfering with the obstacle, move the interfering portion of the patterned light in a vehicle width direction, and
in response to the patterned light interfering with the obstacle after the interfering portion of the patterned light is moved to an edge of a road, move an end point of the patterned light closer to the vehicle until there is no interference with the obstacle.

* * * * *